(12) United States Patent
Teh

(10) Patent No.: US 12,009,739 B2
(45) Date of Patent: Jun. 11, 2024

(54) POWER SUPPLY CIRCUIT WITH HIGH SPEED RESPONSE TO LARGE RUSH VOLTAGE IN POWER SUPPLY

(71) Applicants: Kabushiki Kaisha Toshiba, Tokyo (JP); Toshiba Electronic Devices & Storage Corporation, Tokyo (JP)

(72) Inventor: Chen Kong Teh, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 115 days.

(21) Appl. No.: 17/684,084

(22) Filed: Mar. 1, 2022

(65) Prior Publication Data

US 2023/0095062 A1 Mar. 30, 2023

(30) Foreign Application Priority Data

Sep. 24, 2021 (JP) ................... 2021-155264

(51) Int. Cl.
 *H02M 1/32* (2007.01)
 *G05F 1/571* (2006.01)
 *H02M 3/158* (2006.01)

(52) U.S. Cl.
 CPC .............. *H02M 1/32* (2013.01); *G05F 1/571* (2013.01); *H02M 3/158* (2013.01)

(58) Field of Classification Search
 CPC .......... H02M 1/32; H02M 3/158; G05F 1/571
 See application file for complete search history.

(56) References Cited

U.S. PATENT DOCUMENTS

| | | | |
|---|---|---|---|
| 5,801,573 A | 9/1998 | Kelly et al. | |
| 9,831,665 B2 | 11/2017 | Yoshida | |
| 2001/0028240 A1 | 10/2001 | Fukui | |
| 2012/0105036 A1* | 5/2012 | Midorikawa | G11C 16/30 323/282 |
| 2015/0229304 A1* | 8/2015 | Suzuki | G05F 1/56 327/143 |
| 2020/0379492 A1 | 12/2020 | Sakaguchi | |
| 2022/0350356 A1* | 11/2022 | D'Souza | G05F 1/565 |

FOREIGN PATENT DOCUMENTS

| | | |
|---|---|---|
| JP | 2001282372 A | 10/2001 |
| JP | 2001-358568 A | 12/2001 |
| JP | 3639596 B2 | 4/2005 |
| JP | 2007034405 A | 2/2007 |
| JP | 2015138344 A | 7/2015 |
| JP | 2015153074 A | 8/2015 |
| JP | 6160545 B2 | 7/2017 |
| JP | 2020194269 A | 12/2020 |

* cited by examiner

*Primary Examiner* — Rafael O De Leon Domenech
(74) *Attorney, Agent, or Firm* — Maier & Maier, PLLC

(57) ABSTRACT

A power supply circuit in an embodiment includes a first transistor controlled to be turned on and off by a control signal supplied to a gate to output an output voltage following a predetermined voltage, a second transistor, one end of a current path of which is connected to an input terminal for supplying a power supply voltage, the second transistor outputting the predetermined voltage according to the control signal, and an amplifier circuit configured to amplify a voltage difference between a reference voltage and the predetermined voltage, and output the voltage difference as the control signal.

2 Claims, 2 Drawing Sheets

POWER SUPPLY CIRCUIT WITH HIGH SPEED RESPONSE TO LARGE RUSH VOLTAGE IN POWER SUPPLY

CROSS-REFERENCE TO RELATED APPLICATIONS

This application is based upon and claims the benefit of priority from the prior Japanese Patent Application No. 2021-155264 filed on Sep. 24, 2021; the entire contents of which are incorporated herein by reference.

FIELD

Embodiments described herein relate generally to a power supply circuit.

BACKGROUND

A power supply circuit includes an overvoltage clamp function for, when a large rush voltage occurs, clamping an output voltage to prevent an excessively large voltage from being applied to a circuit unit and the like in a post stage.

DETAILED DESCRIPTION

A power supply circuit in an embodiment includes: a first transistor controlled to be turned on and off by a control signal supplied to a gate to output an output voltage following a predetermined voltage; a second transistor, one end of a current path of which is connected to an input terminal for supplying a power supply voltage, the second transistor outputting the predetermined voltage according to the control signal; and an amplifier circuit configured to amplify a voltage difference between a reference voltage and the predetermined voltage, and output the voltage difference as the control signal.

Embodiments are explained below with reference to the drawings.

First Embodiment

Figure 1:
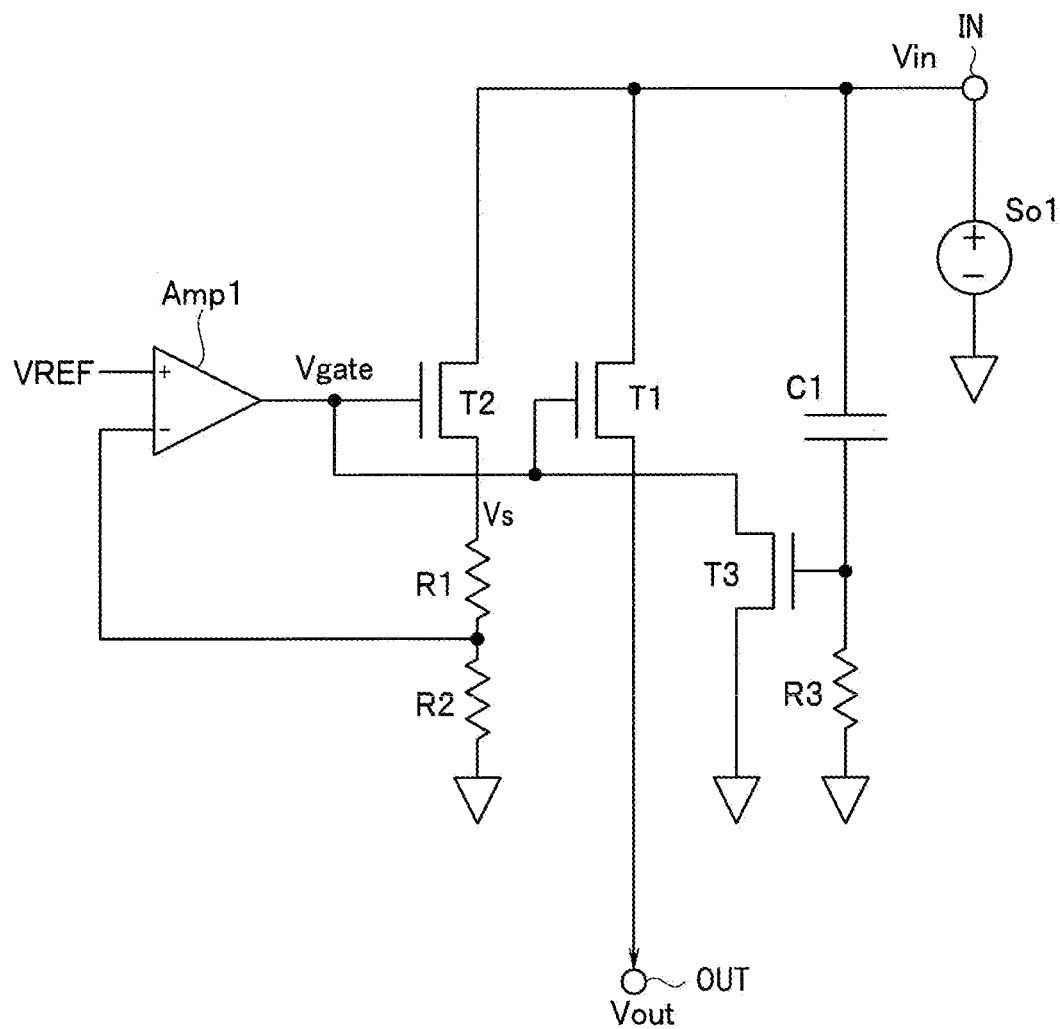
FIG. 1 is a circuit diagram showing an example of a power supply circuit according to a first embodiment.

FIG. 1 is a circuit diagram showing an example of a power supply circuit according to a first embodiment.

The power supply circuit in the present embodiment includes a voltage source So1, NMOS transistors (hereinafter simply referred to as transistors) T1, T2, and T3, an amplifier circuit Amp1, resistors R1, R2, and R3, and a capacitor C1.

A negative polarity terminal of the voltage source So1 is connected to a reference potential point. The voltage source So1 generates a power supply voltage Vin in a positive polarity terminal. The power supply voltage Vin from the voltage source So1 is supplied to drains of the transistors T1 and T2 and the capacitor C1 via an input terminal IN of the power supply circuit.

A source of the transistor T1 configuring a main switch is connected to an output terminal OUT of the power supply circuit. A not-shown load (a circuit unit or the like) is connected to the output terminal OUT. A control signal Vgate for controlling whether to supply an output Vout from the power supply circuit to the load or stop the supply is applied to a gate of the transistor T1. The control signal Vgate is output from the amplifier circuit Amp1.

The transistor T1 outputs, with a source follower configuration, the output Vout following a voltage Vs, which is a predetermined voltage explained below. The transistor T1 is turned on by the control signal Vgate at a high level (hereinafter referred to as H level). The output Vout based on the power supply voltage Vin is supplied to the load. The transistor T1 is turned off by the control signal Vgate at a low level (hereinafter referred to as L level). The supply of the output Vout based on the power supply voltage Vin to the load is stopped.

The transistor T2 is connected in parallel to the transistor T1. A drain of the transistor T2 is connected to the positive polarity terminal of the voltage source So1. A source of the transistor T2 is connected to one end of the resistor R1. The other end of the resistor R1 is connected to one end of the resistor R2. The other end of the resistor R2 is connected to the reference potential point. The control signal Vgate output from the amplifier circuit Amp1 is applied to a gate of the transistor T2. The voltage Vs controlled by the control signal Vgate is output from the source of the transistor T2.

The voltage Vs is divided by the resistors R1 and R2 and supplied to an inverting input terminal of the amplifier circuit Amp1. A reference voltage VREF is supplied to a noninverting input terminal of the amplifier circuit Amp1. An output terminal of the amplifier circuit Amp1 is connected to the gate of the transistor T1, the gate of the transistor T2, and a drain of the transistor T3.

The amplifier circuit Amp1 amplifiers a voltage difference between the reference voltage VREF supplied to the noninverting input terminal and the voltage Vs supplied to the inverting input terminal and outputs the voltage difference as the control signal Vgate.

The voltage Vs corresponding to the control signal Vgate is output from the source of the transistor T2. The output Vout is output from the source of the transistor T1 following the voltage Vs by the source follower configuration. In other words, the output Vout is clamped to the voltage Vs and output.

One end of the capacitor C1 is connected to the positive polarity terminal of the voltage source So1 via the input terminal IN. The other end of the capacitor C1 is connected to one end of the resistor R3. The other end of the resistor R3 is connected to the reference potential point.

A gate of the transistor T3 is connected to a node between the capacitor C1 and the resistor R3. A source of the transistor T3 is connected to the reference potential point. When the power supply voltage Vin rapidly rises, the power supply voltage Vin is supplied to the gate of the transistor T3 via the capacitor C1. The transistor T3 is turned on. Consequently, the transistor T3 pulls down the control signal Vgate to clamp the output Vout.

In this way, the present embodiment has a configuration in which the voltage Vs generated by the transistor T2 according to the control signal Vgate and based on the power supply voltage Vin from the voltage source So1 is fed back to the amplifier circuit Amp1.

Accordingly, when a large rush voltage occurs in the power supply voltage Vin, the power supply circuit in the present embodiment can immediately control the control signal Vgate according to the power supply voltage Vin. Therefore, a high speed response is possible.

Since the power supply circuit in the present embodiment does not feed back the output Vout, the power supply circuit is not affected by an electric current flowing to the transistor T1. Therefore, it is easy to secure a phase margin of the amplifier circuit Amp1.

In the present embodiment, with the source follower configuration, the transistor T1 can substantially equalize the output Vout with the voltage Vs. In other words, since the voltage Vs is fixed by the amplifier circuit Amp1 and the transistor T2, the output Vout can also be fixed to the voltage Vs. When a large rush voltage occurs in the power supply voltage Vin, the output Vout can be clamped to the voltage Vs.

Further, in the present embodiment, the capacitor C1 connected to the voltage source So1 via the input terminal IN and the transistor T3, one end of a current path of which is connected to an output terminal of the amplifier circuit Amp1, the other end of the current path of which is connected to the reference potential point, and the gate of which is connected to the capacitor C1, are provided. Consequently, when a large rush voltage occurs in the power supply voltage Vin, the transistor T3 is turned on via the capacitor C1 and pulls down the control signal Vgate to clamp the output Vout at high speed.

Accordingly, with the power supply circuit in the present embodiment, when a large rush voltage occurs, it is possible to clamp an output voltage at high speed.

Second Embodiment

A second embodiment is explained.

Figure 2:
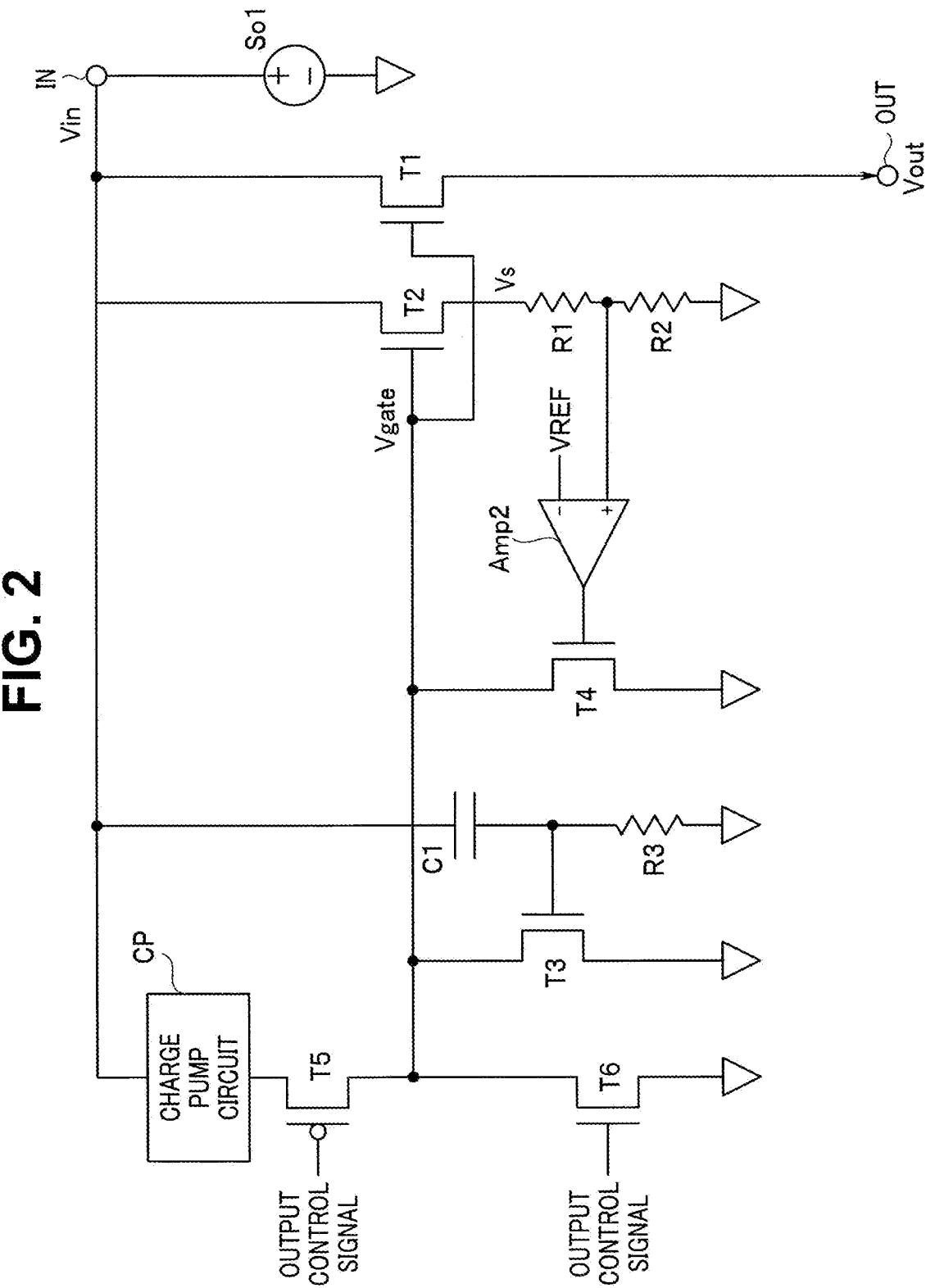
FIG. 2 is a circuit diagram showing an example of a power supply circuit according to a second embodiment.

FIG. 2 is a circuit diagram showing an example of a power supply circuit according to the second embodiment. Note that, in FIG. 2, the same components as the components shown in FIG. 1 are denoted by the same reference sings and explanation of the components is omitted.

The power supply circuit in the present embodiment is configured by replacing the amplifier circuit Amp1 in the first embodiment with an amplifier circuit Amp2 and an NMOS transistor T4 and adding a charge pump circuit CP, a PMOS transistor T5, and an NMOS transistor T6.

A node between the resistors R1 and R2 is connected to a noninverting input terminal of the amplifier circuit Amp2. The reference voltage VREF is input to an inverting input terminal of the amplifier circuit Amp2. An output terminal of the amplifier circuit Amp2 is connected to a gate of the transistor T4.

A drain of the transistor T4 is connected to the gates of the transistors T1 and T2 and a source of the transistor T4 is connected to the reference potential point. The transistor T4 is controlled to be turned on and off according to an output of the amplifier circuit Amp2. When a large rush voltage occurs, a signal at the H level is input to the gate of the transistor T4 from the amplifier circuit Amp2. The transistor T4 is turned on and pulls down the control signal Vgate.

In the present embodiment, the control signal Vgate is generated by the charge pump circuit CP and the transistors T5 and T6. In order to turn on the transistor T1, the control signal Vgate needs to be a voltage higher than the power supply voltage Vin. The power supply voltage Vin is supplied to the charge pump circuit CP. The charge pump circuit CP generates a voltage higher than the power supply voltage Vin using the power supply voltage Vin and outputs the voltage.

Current paths of the transistors T5 and T6 are connected in series between an output terminal of the charge pump circuit CP and the reference potential point. In other words, a source of the transistor T5 is connected to an output of the charge pump circuit CP, a drain of the transistor T5 is connected to the gate of the transistor T1, and an output control signal is given to a gate of the transistor T5. A drain of the transistor T6 is connected to the gate of the transistor T1, a source of the transistor T6 is connected to the reference potential point, and an output control signal is given to a gate of the transistor T6.

When the output control signal is at the H level, the transistor T5 is off, the transistor T6 is on, the control signal Vgate changes to the L level, and the transistor T1 is turned off. In other words, when the output control signal at the H level is supplied to the gates of the transistors T5 and T6, the supply of the output Vout to the load is stopped. In other words, the main switch is brought into an OFF state by the output control signal at the H level.

When the output control signal is at the L level, the transistor T5 is on, the transistor T6 is off, the control signal Vgate changes to the H level with an output of the charge pump circuit CP, and the transistor T1 is turned on. In other words, when the output control signal at the L level is supplied to the gates of the transistors T5 and T6, the output Vout is supplied to the load. In other words, the main switch is brought into an ON state by the output control signal at the L level.

Like the first embodiment, the present embodiment has a configuration in which the voltage Vs generated by the transistor T2 according to the control signal Vgate and based on the power supply voltage Vin from the voltage source So1 is fed back to the amplifier circuit Amp1.

Accordingly, as in the first embodiment, when a large rush voltage occurs in the power supply voltage Vin, the power supply circuit in the present embodiment can immediately control the control signal Vgate according to the power supply voltage Vin. Therefore, a high speed response is possible.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A power supply circuit comprising:
   a first transistor controlled to be turned on and off by a control signal supplied to a gate to output an output voltage following a predetermined voltage;
   a second transistor, one end of a current path of the second transistor being connected to an input terminal for supplying a power supply voltage, the second transistor outputting the predetermined voltage according to the control signal;
   an amplifier circuit configured to amplify a voltage difference between a reference voltage and the predetermined voltage, and output the voltage difference as the control signal;
   a third transistor, one end of a current path of the third transistor being connected to an output terminal of the amplifier circuit, another end of the current path of the third transistor being connected to a reference potential point, the third transistor being turned on and off according to a gate voltage; and
   a capacitor connected between the input terminal for the power supply voltage and a gate of the third transistor.

2. The power supply circuit according to claim 1, further comprising:
   a charge pump circuit configured to receive an input of the power supply voltage and generate and output a voltage higher than the power supply voltage;
   a fourth transistor configured to output an output of the charge pump circuit as the control signal according to an output control signal; and
   a fifth transistor configured to output an output of a reference potential point as the control signal according to the output control signal.

* * * * *